US009510201B1

(12) United States Patent
Shimoon et al.

(10) Patent No.: US 9,510,201 B1
(45) Date of Patent: Nov. 29, 2016

(54) CONNECTING A DEVICE TO A WIRELESS NETWORK

(71) Applicant: Amazon Technologies, Inc., Reno, NV (US)

(72) Inventors: Armen Bearj Shimoon, Cupertino, CA (US); Aaron Levy Kanter, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 29 days.

(21) Appl. No.: 14/279,713

(22) Filed: May 16, 2014

(51) Int. Cl.
*H04W 4/00* (2009.01)
*H04W 12/08* (2009.01)
*H04W 76/02* (2009.01)

(52) U.S. Cl.
CPC ........... *H04W 12/08* (2013.01); *H04W 76/023* (2013.01)

(58) Field of Classification Search
None
See application file for complete search history.

(56) References Cited

U.S. PATENT DOCUMENTS

| 2010/0232337 | A1* | 9/2010 | Das | H04W 4/12 370/312 |
| 2012/0284517 | A1* | 11/2012 | Lambert | H04L 63/0823 713/169 |
| 2013/0235781 | A1* | 9/2013 | Dangui | H04L 1/1614 370/312 |
| 2014/0064252 | A1* | 3/2014 | Lim | H04W 72/048 370/331 |
| 2014/0192809 | A1* | 7/2014 | Park | H04W 48/16 370/392 |
| 2014/0337633 | A1* | 11/2014 | Yang | H04W 12/08 713/178 |
| 2014/0341234 | A1* | 11/2014 | Asterjadhi | H04L 69/324 370/474 |

* cited by examiner

*Primary Examiner* — Anh-Vu Ly
(74) *Attorney, Agent, or Firm* — Sutherland Asbill & Brennan LLP

(57) ABSTRACT

Transmitting messages via one or more beacon signals is disclosed. The beacon signals may be generated by a transmitting device by partitioning the message into a plurality of segments, such that each of the message segments do not exceed a segment length that may be carried by the beacon signals transmitted by the transmitting device. A receiving device may receive the beacon signals carrying the segments of the message and reconstitute the message from the received beacon signals. The transmitted message may include wireless network credentials, that when reconstituted, may be used by the receiving device to connect to a wireless network, such as a WiFi network.

19 Claims, 9 Drawing Sheets

CONNECTING A DEVICE TO A WIRELESS NETWORK

BACKGROUND

Certain wireless communications protocols, such as WiFi and or WiFi direct, may have mechanisms for handshaking that use beacons that are transmitted by a wireless access point, base station, wireless router, and/or other electronic devices acting as a wireless router. These beacon signals are typically used by users in proximity of the wireless access point, base station, wireless router, and/or other electronic devices acting as a wireless router, such as within radio range. The beacon signals transmitted may carry information that allows an electronic device to communicatively link to the entity transmitting the beacon signal. In some cases, one may wish to connect a user device without a user interface for entering wireless network credentials to a wireless network, such as a WiFi network.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1A:
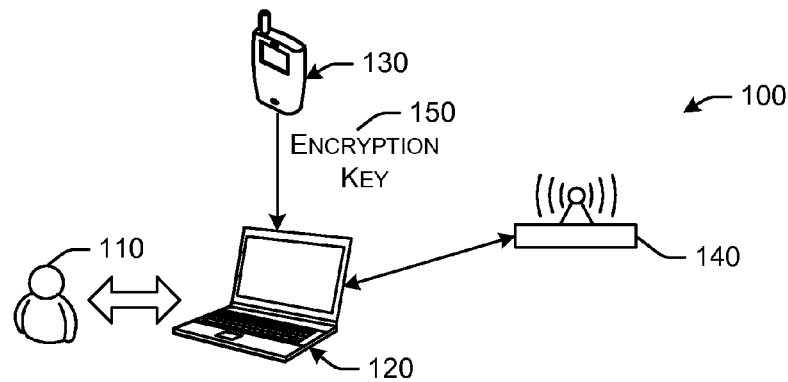
FIG. 1A is a schematic diagram that illustrates an environment where an encryption key is transmitted for connecting a device to a wireless network, in accordance with example embodiments of the disclosure.

Example embodiments of the present disclosure may include systems, methods, apparatus, and protocols for broadcasting a message by a companion device to another device via one or more wireless beacon signals. The message may be of any suitable type, such as, for example, authentication credentials that may be utilized by the device receiving the authentication credentials to connect to a wireless network. The message to be broadcast may, in example embodiments, be partitioned into segments such that each segment can be carried by a wireless beacon signal that may be broadcast by the companion device and received by the device. The device may receive the broadcast of one or more wireless beacon signals from the companion device, wherein each of the beacon signals carry at least a segment of the message, such as a message carrying wireless network authentication credentials, and reconstitute the message from the segments as carried by the one or more wireless beacon signals. In example embodiments, the device may not have a user input interface for entry of wireless network authentication credentials directly into the device. Therefore, the companion device may be used to provide the device with the wireless network authentication credentials that the device may then use to connect to the wireless network.

In further example embodiments of the disclosure, the companion device may provide the device with the authentication credentials via one or more WiFi beacons. The authentication credentials, such as the service set identifier (SSID) and/or the passphrase, may be encoded onto a SSID field of the one or more WiFi beacons. The authentication credentials may be encoded in any suitable format, such as base64 format, extensible markup language (XML) format, and/or American Standard Code for Information Interchange (ASCII) format. The authentication credentials may further be partitioned into segments such that each segment is of a size that can be carried by the maximum bit size of the SSID field of the WiFi beacon. In still further example embodiments, the segments of the authentication credentials may be part of a string that is carried by the SSID field of the WiFi beacon. The string may include, for example, an indication (e.g., protocol indicator) that the protocols as described herein for transmitting messages via wireless network beacons are being used, a packet index, a total number of segments associated with the message, and a payload, or the segment of authentication credential being transmitted. The protocol indicator, the message type, the packet index, and the total number of segments associated with the message may collectively be referred to as the packet header. The strings when generated may be carried by each of the one or more beacon signals. In this case the payload may be sized in a manner such that all of the string (e.g., payload in addition to the header) may fit into the SSID field of the respective corresponding WiFi beacon.

In some example embodiments, the authentication credentials may be transmitted by the companion device to the device in an encrypted format. This may generally prevent other parties from detecting the transmitted beacon signals and determining the authentication credentials carried by the beacon signals. In these example embodiments, the encryption of the authentication credentials of the wireless network may be enabled by an encryption key that is transmitted from the device to the companion device. The authentication key may be utilized by the companion device to encrypt the authentication credentials that may include the SSID and/or the passphrase, prior to segmenting and string generation, and beacon signal generation. The encryption key may be any suitable encryption key and may be transmitted by the device to the companion device in a manner similar to the mechanism by which the companion device transmits the authentication credentials to the device. In other words, the encryption key may be segmented to appropriate size segments that can be carried by a sequence of one or more beacon signals. Strings may be generated that have the corresponding respective segment of the encryption key as the payload and the header may include a protocol indicator, a message index, a total number of segments for the message to be transmitted, and a transmission type. The encryption key that is transmitted, in example embodiments, may be a public encryption key that may be used for encrypting. In this case the corresponding private encryption key of the public-private pair may be known and used by the encryption key transmitting entity to decrypt any messages that it receives that has been encrypted using the public encryption key.

In yet further example embodiments, the device may provide a personal identification number (PIN). In some example embodiments, this PIN may be a fixed PIN such as a code that is provided along with the device, such as at a time of purchase. In other example embodiments, this PIN may be generated upon request, such as when a network pairing of the device is to be performed. The PIN may be incorporated into a request for an encryption key that may be carried on a beacon signal and transmitted by the companion device. The device may receive this beacon signal carrying the request for encryption key and may identify a match in the PIN carried on the beacon signal with the PIN provided by the device. Responsive to identifying the match of the PIN, the device may commence transmission of the encryption key, in segments as necessary and carried by one or more beacon signals, as described above.

In yet further example embodiments, messages (e.g., the encryption key from the device to the companion device or the authentication credentials from the companion device to the device) may utilize communications protocols as described herein for transmission via one or more wireless beacon signals. In these example embodiments the sending device (e.g., the device in the case of transmitting the encryption key or the companion device in the case of transmitting the wireless network authentication credentials) may segment the message into a plurality of segments, such that each of the segments are of a length that can be incorporated in a string that can be carried by a beacon signal. A total number of segments associated with the transmission of the message may be determined and each of the segments may be assigned an index. For example, a particular message in the form of an encryption key to be transmitted from the device to the companion device may be segmented into 7 segments. Each of the segments, in this case, may be associated with an index from 0 to 6, for a total of 7 segments. The payload, or message segment or encrypted message segment, may be combined with a header corresponding to each of the segments to generate the string corresponding to the message segment. The header for each segment may include an indicator that this message transfer protocol (e.g., where the message is broadcast via a wireless network beacon signal, such as WiFi) is being used. Therefore, based at least in part on the protocol indicator, the message may be carried by, and may be identified as carrying a message from similar beacon signals that are used for networking and/or handshaking functionality with existing communications protocols. The protocol indicator may be any predetermined string of characters, such as "BAIR" (e.g., acronym for blind pairing), or indeed any predetermined string of characters. In some example embodiments, the string of characters may be characters that may typically not be common and/or allowed as characters that may be included in a WiFi SSID, such as "%&^*" or ")@" or any other string of characters to designate the use of this protocol. In some example embodiments, the string of character(s) of the protocol indicator may be invisible text, and thereby would be unlikely to be entered by a user 110 as an identifier other than as a protocol indicator. In example embodiments, the message may further include an indicator of a type of the message, such as, for example sending text segment or segment receipt acknowledgement. The header, in example embodiments, may further include the index of the segment and/or string of the beacon signal and the total number of segments of the message.

In example embodiments, a sending and/or transmitting entity (e.g., the device or the companion device) may transmit the plurality of beacon signals in sequence of the segment index. The transmitting device may transmit a particular beacon signal for a predetermined time, such as, for example, 0.5 seconds, before transmitting the next beacon signal in the sequence of beacon signals carrying the plurality of message segments. The receiving entity (e.g., the device receiving the wireless network authentication credentials or the companion device receiving the encryption key) may transmit an acknowledgement message every time a beacon signal and its corresponding message segment may be received by the receiving device. This acknowledgement message may be incorporated in and carried on a beacon signal in a similar fashion as described for the transmission of the message. The transmitting entity may receive the acknowledgement messages as each of the segments of the message are transmitted by the receiving entity. If the transmitting entity does not receive an acknowledgement message corresponding to a particular segment, then the transmitting device may transmit the beacon signal of the non-acknowledged segment again until an acknowledgement corresponding to that segment is received. In this way, the transmitting entity may be have some indication that all of the transmitted segments have been received by the receiving entity and if any of the segments have not been received, then the transmitting entity may transmit those corresponding beacon signals again until it receives an acknowledgement that those segments have been received by the receiving entity.

The beacon signal may, in certain example embodiments, be a beacon signal associated with an established communications protocol, such as WiFi, Bluetooth, and/or WiFi direct. In certain example embodiments, the message may be incorporated in a service set identifier field of the beacon signal. In example embodiments, this SSID field may be up to 32 bytes in length. In these example embodiments, if the packet (e.g., header and payload/message segment) of the beacon signal is encoded in ASCII encoding, or 1 byte/character, then each beacon signal, in example embodiments, may be configured to carry a maximum of 32 characters of header and payload and may the message to be transmitted may be segmented appropriately.

In example embodiments, the message receiving device may receive the beacon signal, such as wirelessly, using RF infrastructure (e.g., antenna(s), radio(s), and/or electronics) of the message receiving device (e.g., the device or the companion device). In some cases the RF infrastructure of the message receiving device is infrastructure that is used for other communications function such as communicating with one or more wireless networks, such as a WiFi network or a WiFi direct link. The message receiving device may execute instructions and/or application(s) thereon that enable the message receiving device to identify that the received beacon signal carries a message, such as by identifying a protocol indicator in the string carried by the beacon signal, and then identify the message based at least in part on the received beacon signal. In other words, in example embodiments, the message receiving device may recognize one or more symbols and/or characters within one or more fields of the received beacon symbol to determine that the beacon signal is carrying a message, rather than only information for indicating the availability of a wireless network. Therefore, the message receiving device may extract message segments from the received message segments, and reconstitute the message from the identified message segments. The message receiving device may further be configured to parse portions, such as the SSID field, of the received beacon signal to determine and/or extract the message carried thereon.

In certain example embodiments, the companion device may be communicatively connected to a wireless network while providing the wireless network credentials via the one or more beacon signal transmissions to the device. In some further example embodiments, the companion device may be communicatively connected to the wireless network for which it is providing the authentication credentials to the device for communicative connection. In yet other example embodiments, the companion device may not be connected to a wireless network at all.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 1B:
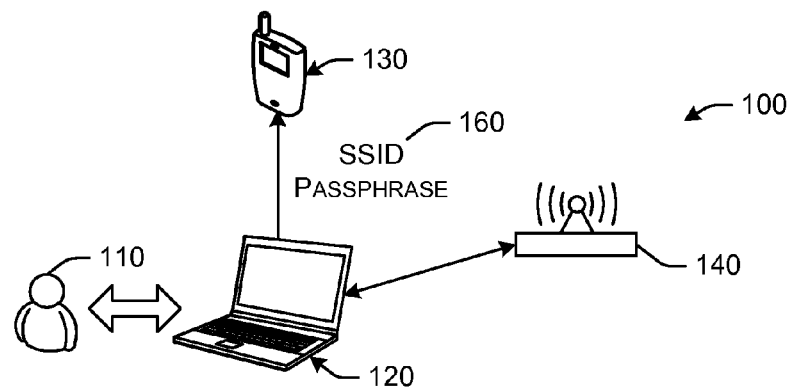
FIG. 1B is a schematic diagram that illustrates the environment of FIG. 1A where an authentication credentials are transmitted for connecting the device to the wireless network, in accordance with example embodiments of the disclosure.
Figure 1C:
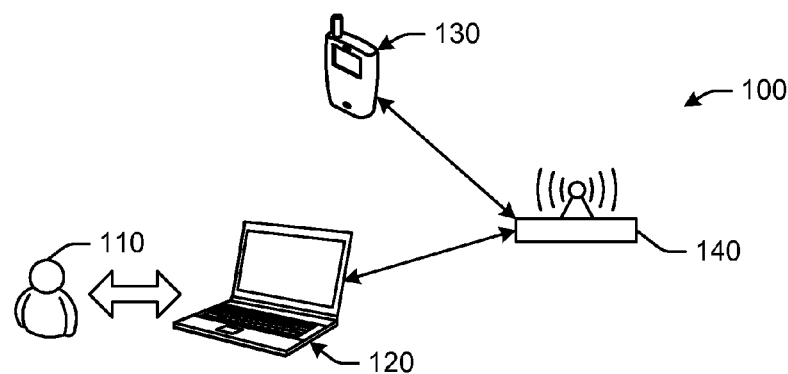
FIG. 1C is a schematic diagram that illustrates the environment of FIG. 1A where the device is connected to the wireless network, in accordance with example embodiments of the disclosure.

The concepts as discussed above may better be understood in reference to FIGS. 1A, 1B, and 1C. FIG. 1A is a schematic diagram that illustrates an environment 100 where an encryption key 150 is transmitted for connecting a device 130 to a wireless network, in accordance with example embodiments of the disclosure. In the environment 100, a user 110 may interact with a companion device 120 to enable the connection of the device 130 to the wireless network as provided by a base station 140.

In certain example embodiments, the companion device 120, may be any suitable electronic device, such as a personal communication device, that may be configured to execute instructions and/or applications thereon that enable a process for communicating (e.g., receiving and/or transmitting messages via one or more beacon signals) with the device 130. The companion device 120 may be configured to receive a beacon signal that is broadcast by the device 130 and determine therefrom if the beacon signal carries a message. In example embodiments the companion device 120 may have instructions and/or applications running thereon that configure it to parse a received beacon signal to determine if the received beacon signal indicates a message is carried thereon or if the beacon signal is otherwise an announcement of proximity of the base station 140. In certain cases, the companion device 120 may be configured to identify the received beacon signal may as carrying a message, or segments thereof, such as an encryption key 150, based at least in part on symbols, bits, or other information carried by the beacon signal. For example, in some cases, a predetermined sequence of characters in a particular field of the beacon signal may indicate that the beacon signal carries a message.

The companion device 120 may be configured to execute instructions and/or application(s) thereon that configure the companion device 120 to identify the message, such as the encryption key 150, or segment thereof, based at least in part on the received beacon signal(s). Therefore, the companion device 120 may be configured to extract message segments from the received message segments, and reconstitute the message from the identified message segments, such as by concatenating the received message segments. In example embodiments, the received segments may be segments of the encryption key 150. The companion device 120 may further be configured to parse portions, such as the SSID field of a WiFi beacon signal, of the received beacon signal to determine and/or extract the message carried thereon.

In example embodiments, the companion device 120 may be configured to generate and transmit a plurality of beacon signals in sequence. The companion device 120 may be configured to transmit a particular beacon signal for a predetermined period of time, such as, for example, 0.5 seconds, before transmitting the next beacon signal in the sequence of beacon signals carrying the plurality of message segments. The companion device 120 may be configured to receive an acknowledgement message corresponding to each of the segments of the message that are transmitted by the companion device 120. If the companion device 120 does not receive an acknowledgement message corresponding to a particular segment, then the companion device 120 may be configured to transmit the beacon signal of the non-acknowledged segment again, until an acknowledgement corresponding to that segment is received. In this way, the companion device 120 may be configured to determine that all of the transmitted segments have been received by the device 130 and if any of the segments have not been received, then the companion device 120 may be configured to transmit those corresponding beacon signals again until it receives an acknowledgement that those segments have been received by the receiving entity.

The companion device 120 may be configured to transmit an acknowledgement message every time a beacon signal and its corresponding message segment, such as segments of the encryption key, is received by the companion device 120. This acknowledgement message may be incorporated in and carried on a beacon signal as described herein.

The companion device 120, while depicted as a laptop computing device, may be one of any variety of client devices, electronic devices, communications devices, and/or mobile devices. The companion device 120 may include, but is not limited to, tablet computing devices, electronic book (ebook) readers, netbook computers, notebook computers, laptop computers, desktop computers, personal digital assistants (PDA), smart phones, web-enabled televisions, video game consoles, set top boxes (STB), or the like. The companion device 120 may have one or more input/output interfaces, such as a keyboard, mouse, microphone and voice recognition engine, or the like, for receiving input from the user 110, such as WiFi authentication credentials for connecting to a WiFi network, such as a WiFi network provided by the base station 140.

The device 130 may be any suitable electronic device and may be any one of the devices discussed above with relation to the companion device 120. In example embodiments, the device 130 may lack an input interface and, as a result, may not be configured to receive input from the user 110. Therefore, in some example embodiments, the device 130 may not be configured to receive WiFi network credentials by user input to the device 130.

The device 130 may be configured to receive a beacon signal that is broadcast by the companion device 120 and determine therefrom if the beacon signal carries a message, such as an encryption key request message or a wireless network authentication credential. In example embodiments the device 130 may have instructions and/or applications running thereon that configure it to parse a received beacon signal to determine if the received beacon signal indicates a message is carried thereon or if the beacon signal is otherwise an announcement of proximity of the base station 140. In certain cases, the device 130 may be configured to identify the received beacon signal may as carrying a message, or segments thereof, such as an encryption key request or a wireless network authentication credential, based at least in part on symbols, bits, or other information carried by the beacon signal. For example, in some cases, a predetermined sequence of characters in a particular field of the beacon signal may indicate that the beacon signal carries a message.

The device 130 may be configured to execute instructions and/or application(s) thereon that configure the device 130 to identify the message, such as the wireless network authentication credential, or segment thereof, based at least in part on the received beacon signal(s). Therefore, the device 130 may be configured to extract message segments from the received beacon signals, and reconstitute the message from the identified message segments, such as by concatenating the received message segments. In example embodiments, the received segments may be segments of the wireless network authentication credentials, such as authentication credentials for connecting to the base station 140. The device 130 may further be configured to parse portions, such as the SSID field of a WiFi beacon signal, of the received beacon signal to determine and/or extract the message carried thereon.

In example embodiments, the device 130 may be configured to generate and transmit a plurality of beacon signals in sequence. The device 130 may be configured to transmit a particular beacon signal for a predetermined period of time, such as, for example, 0.5 seconds, before transmitting the next beacon signal in the sequence of beacon signals carrying the plurality of message segments, such as segments of the encryption key. The device 130 may be configured to receive an acknowledgement message corresponding to each of the segments of the message that are transmitted by the device 130. If the device 130 does not receive an acknowledgement message corresponding to a particular segment, then the device 130 may be configured to transmit the beacon signal of the non-acknowledged segment again, until an acknowledgement corresponding to that segment is received. In this way, the device 130 may be configured to determine that all of the transmitted segments have been received by the companion device 120 and if any of the segments have not been received, then the device 130 may be configured to transmit those corresponding beacon signals again until it receives an acknowledgement that those segments have been received by the companion device 120.

The device 130 may be configured to transmit an acknowledgement message every time a beacon signal and its corresponding message segment, such as segments of the wireless network authentication credentials, is received by the device 130. This acknowledgement message may be incorporated in and carried on a beacon signal as described herein.

The device 130 may further be configured to reconstitute wireless network authentication credentials as received via a plurality of beacon signals transmitted by the companion device 120. Upon reconstituting the authentication credentials, the device 130 may be configured, in example embodiments, to connect to the wireless network corresponding to the authentication credentials, such as the wireless network provided by the base station 140.

The base station 140 may be configured to provide communication services via any suitable communicative mechanism and/or protocols, including, for example, the communications formats and/or protocols discussed with relation to the device 130 and/or the companion device 120. In other words, the base stations may provide communications services via any one or more of WiFi, direct WiFi, Bluetooth, 3G mobile communication, 4G mobile communication, long-term evolution (LTE), WiMax, direct satellite communications, or combinations thereof. In example embodiments, the base station 140 may provide wireless connectivity one or more networks. The networks may include any one of a combination of different types of suitable communications networks, such as cable networks, the Internet, wireless networks, cellular networks, and other private and/or public networks. Furthermore the networks may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

In certain example embodiments, the base station 140 may be a WiFi access point or a wireless router. In these embodiments, the communications protocols associated with the base station 140 may be defined by various sections of Institute of Electrical and Electronics Engineers (IEEE) 802.11 standards. These standards may include, but may not be limited to, communications via 2.4 GHz channels (e.g. 802.11b, 802.11g, 802.11n), 5 GHz channels (e.g. 802.11n, 802.11ac), or 60 GHZ channels (e.g. 802.11ad). These communications protocols may involve predefined beacons signals that may be of a fixed bit size and have predefined fields. These beacon signals may be broadcast by the base stations 140 to announce their availability to provide connectivity to the wireless network provided by the base station 140, in some cases, for a fee. In other example embodiments, the base station may provide communicative connections in any suitable protocol, such as BlueTooth (BT), and/or WiFi direct, or the like.

In accordance with example embodiments of the disclosure, beacon signals in accordance and/or similar to the aforementioned protocols may be generated and/or received by other entities, such as the device 130 and/or the companion device 120, and used to carry a message. In other words, beacon signal protocols similar to those used by the base station 140 may be utilized to broadcast the messages such as those carrying the authentication credentials (e.g., SSID and passphrase) to connect to the base station 140. Therefore, in some of these example embodiments, pre-established beacon signal formats may be modified to carry the message on the beacon signal, as described herein. For example, the SSID field of the beacons signal may be modified to carry the message by the device 130 or the companion device 120.

As depicted in FIG. 1A, the companion device 120 may be communicatively connected to the wireless network, as provided by the base station 140 and the device 130 may not initially be communicatively coupled to the base station 140. The device 130 may, in example embodiments, lack an input interface and, therefore, may not be configured to receive input of authentication credentials for connecting to the wireless network provided by the base station 140 from the user 110. The device 130, however, may be configured to provide an encryption key 150 that may be carried by one or more beacon signals transmitted by the device 130 and received by the companion device 120.

In some example embodiments, the encryption key 150 may be provided by the device periodically. In other example embodiments, the encryption key 150 may be provided responsive to the device 130 receiving a request for the encryption key. In some cases, the request for encryption key may be in the form of a beacon signal generated and transmitted by the companion device 120, as the entity requesting the encryption key from the device 130. In example embodiments, the request for encryption key as received by the device 130 may include a personal identification number (PIN) associated with and/or generated by the device 130. In some cases, the PIN may be just numeric or, in other cases, the PIN may be alpha-numeric. The PIN may be any suitable length, such as for example, 4 characters or 6 characters. In some example embodiments, the PIN may be a fixed string of characters. In other example embodiments, the PIN may be periodically generated/updated and/or generated/updated when an encryption key is to be transmitted by the device 130. In example embodiments, the device 130 may be configured to generate a PIN, such as upon request or by periodic update, using a pseudo-random number generator. In these example embodiments, the device 130 may be configured to render the PIN to the user 110 (e.g., on a display screen or on a speaker of the device 130). The companion device 120 may be configured to receive input from the user 110 via one or more input interfaces, such as a keyboard, speaker, and/or touch sensitive display, to receive the PIN, as provided by the device 130. The companion device 120 may then be configured to generate and transmit the beacon signal indicating a request to broadcast the encryption key and carrying the PIN corresponding to the recipient device 130. In example embodiments, the request for the encryption key may be a message carried along with the PIN in the SSID data field, such as of a WiFi beacon signal. In example embodiments, the request for the encryption key may by carried by more than on beacon signal, as broadcast by the companion device 120.

The device 130, upon receiving the request for the encryption key, may be configured to parse the beacon signal carrying the request and identify that the request for beacon signal is intended for the device 130, such as by identifying a match of the corresponding PIN encoded onto the beacon signal. Upon determining that the device 130 is to transmit an encryption key, the device may identify the encryption key. In example embodiments, the encryption key 150 may be fixed. In other example embodiments, the encryption key 150 may be generated upon request for the same, such as by utilizing a pseudo-random number generator. The encryption key 150 may be any suitable type of encryption key including, but not limited to, symmetric encryption keys, asymmetric encryption keys, public keys, private keys, combinations thereof, or the like. In example embodiments, a public portion of a public-private encryption key may be transmitted by the mechanism as described herein by the device 130 to the companion device 120. The private portion of the encryption key may be used by the device 130 to decrypt any messages received from the companion device 120 that has been encrypted using the transmitted public encryption key. The encryption key 150 may be in any suitable format including, but not limited to, base64 format, extensible markup language (XML) format, and/or American Standard Code for Information Interchange (ASCII) format.

In some example embodiments, the encryption key 150 may be of a length such that it may be carried by a single beacon signal, such as a WiFi or a Bluetooth beacon signal, broadcast by the device 130. For example, the encryption key 150 may be about 32 bytes or less in length and may be carried in the SSID data field of a WiFi beacon signal. In other example embodiments, the encryption key 150 may be a length such that it is to be carried by two or more beacon signals generated and broadcast by the device 130 to be received by the companion device 120. In other words, the encryption key 150 may be segmented to appropriate size segments that can be carried by a sequence of two or more beacon signals. Strings may be generated that have the corresponding respective segment of the encryption key as the payload and the header may include a protocol indicator, a message index, a total number of segments for the message to be transmitted, and a transmission type. The strings may then be carried by the beacon signals, as generated and broadcast by the device 130.

In some example embodiments, the device 130 may be configured to transmit the plurality of beacon signals in sequence of the segment index. The device 130 may further be configured to transmit a particular beacon signal for a predetermined period of time, such as, for example, 0.5 seconds, before transmitting the next beacon signal in the sequence of beacon signals carrying the plurality of encryption key segments. The companion device 120 may be configured to transmit an acknowledgement message every time a beacon signal carrying an encryption key segment may be received by the companion device 120. This acknowledgement message may be incorporated in and carried on a beacon signal in a similar fashion as described for the transmission of the encryption key 150. The device 130 may receive the acknowledgement messages as each of the segments of the message are transmitted by the device 130. If the device 130 does not receive an acknowledgement message corresponding to a particular segment of the encryption key, then the device 130 may transmit the beacon signal of the non-acknowledged segment of the encryption key 150 again until an acknowledgement corresponding to that segment is received. The companion device 120 may be configured to reconstitute the encryption key 150 from the plurality of segments of the encryption key received via the corresponding respective beacon signals, such as by concatenating the received segments of the encryption key.

FIG. 1B is a schematic diagram that illustrates the environment of FIG. 1A where an authentication credential 160 is transmitted for connecting the device 130 to the wireless network, in accordance with example embodiments of the disclosure. As shown, the authentication credentials 160 may include an SSID associated with a basic service set (BSS) or extended service set (ESS) with which the base station 140 is associated and a passphrase associated with the BSS or ESS provided by the base station 140. In example embodiments, the companion device 120 may be configured to encrypt the authentication credentials using the encryption key 150. The encrypted authentication credentials 160 may then be segmented and transmitted via two or more strings, in a similar fashion as described for the broadcast of the encryption key 150. On the receiving end, the device 130 may be configured to receive the plurality of beacon signals, such as WiFi beacon signals, carrying the segments of the authentication credentials and reconstruct the encrypted authentication credentials therefrom. The device 130 may still further be configured to decrypt the encrypted authentication credentials such as by using the encryption key or the inverse thereof.

FIG. 1C is a schematic diagram that illustrates the environment 100 of FIG. 1A where the device 130 is connected to the wireless network, in accordance with example embodiments of the disclosure. The device 130 may be configured to utilize the authentication credentials 160, as depicted in FIG. 1B, to connect to the wireless network, as provided by the base station 140.

It will be appreciated that the device 130, which may not have a mechanism for receiving user 110 input, such as authentication credentials, may be configured to receive the authentication credentials from its companion device 120. In this case, the companion device 120 does not have to disconnect from any wireless networks to which it is connected to broadcast a series of beacon signals to transmit the wireless network credentials in parts to the device 130. Furthermore, the authentication credentials, as transmitted by the companion device 120, may be encrypted using an encryption key commonly known and provide by the device 130 to the companion device 120. By encrypting the authentication credentials prior to transmission, it may be relatively more difficult for a third party device to snoop and/or intercept the authentication credentials, as broadcast by the companion device 120.

Figure 2:
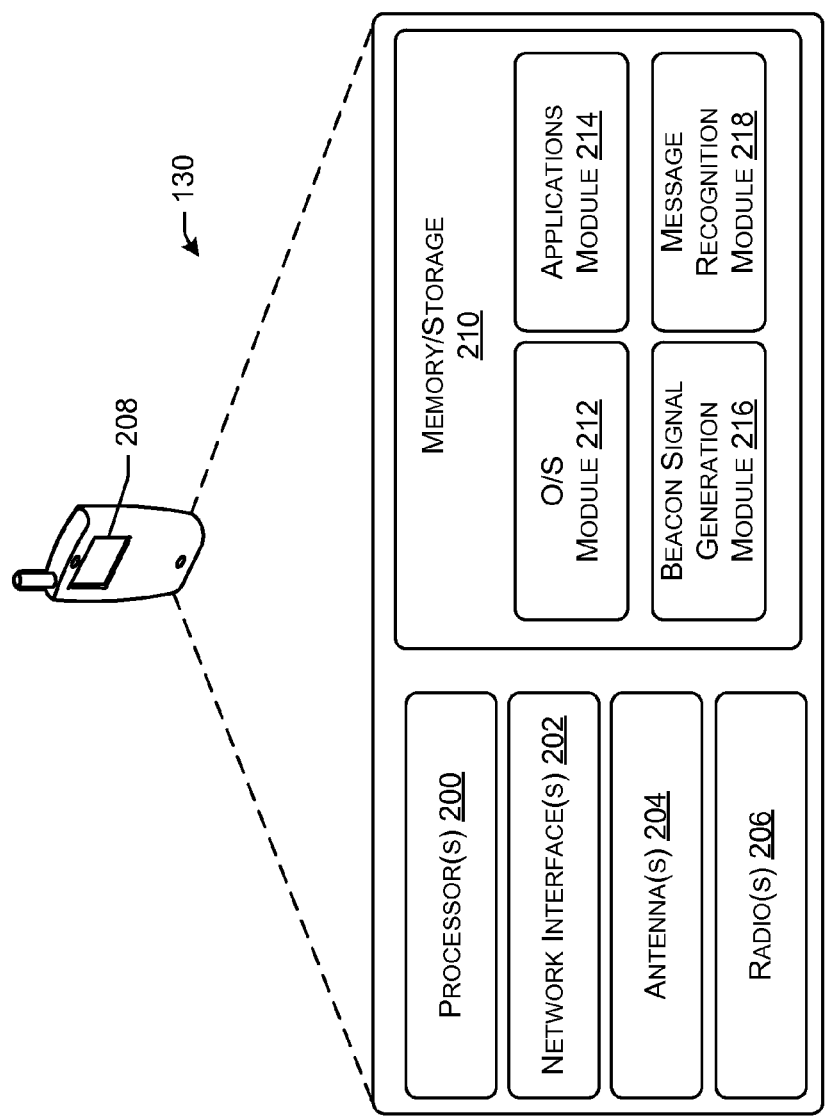
FIG. 2 is a block diagram illustrating an example device of the environments of any of FIGS. 1A-1B, in accordance with example embodiments of the disclosure.

FIG. 2 is a block diagram illustrating an example device 130 of the environment 100 of any of FIGS. 1A-1B, in accordance with example embodiments of the disclosure. The device 130 may include one or more processors 200, one or more network interface(s) 202, one or more antenna(s) 206, one or more output interfaces 208, and one or more memories or storage 210.

In some examples, the processors 200 of the device 130 may be implemented as appropriate in hardware, software, firmware, or combinations thereof. Software or firmware implementations of the processors 200 may include computer-executable or machine-executable instructions written in any suitable programming language to perform the various functions described. Hardware implementations of the processors 200 may be configured to execute computer-executable or machine-executable instructions to perform the various functions described. The one or more processors 200 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The device 130 may also include a chipset (not shown) for controlling communications between the one or more processors 200 and one or more of the other components of the imaging system 200. The one or more processors 220 may also include one or more application specific integrated circuits (ASICs) or application specific standard products (ASSPs) for handling specific data processing functions or tasks.

The network interfaces(s) 202 may allow the device 130 to communicate via network and/or via other communicative channels. The output interface(s) 208 may be configured to provide an output, such as a rendering of a PIN. This may include, for example, a display or a speaker.

The antenna(s) 204 may be any suitable type of antenna corresponding to the communications protocols used by the device 130. Some non-limiting examples of suitable communications antenna(s) 204 include WiFi antennas, IEEE 802.11 family of standards compatible antennas, directional antennas, non-directional antennas, dipole antennas, folded dipole antennas, patch antennas, multiple-input multiple-output (MIMO) antennas, or the like. The antenna(s) 204 may be communicatively coupled to the one or more radio(s) 206 to transmit and/or receive signals, such as communications signals and/or beacon signals.

The transmit/receive or radios 206 may include any suitable radio for transmitting and/or receiving radio frequency (RF) signals in the bandwidth and/or channels corresponding to the communications protocols utilized by the device 130 to communicate with, provide connectivity to, and/or broadcast beacon signals to other devices. The radio 206 may include hardware and/or software to modulate communications signals according to pre-established transmission protocols. The radio 206 may further have hardware and/or software instructions to communicate via one or more WiFi and/or WiFi direct protocols, as standardized by the Institute of Electrical and Electronics Engineers (IEEE) 802.11 standards. In certain embodiments, the radio 206, in cooperation with the communications antennas 204, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In alternative embodiments, non-WiFi protocols may be used for communications by the device 130, such as Bluetooth, dedicated short-range communication (DSRC), or other packetized radio communications. The radio 206 may include any known receiver and baseband suitable for communicating via the communications protocols of device 130. The radio component may further include a low noise amplifier (LNA), additional signal amplifiers, an analog-to-digital (A/D) converter, one or more buffers, and digital baseband.

The memory or storage 210 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 200, as well as data generated or received during the execution of these programs. Turning to the contents of the memory 200 in more detail, the memory 200 may include one or more operating systems (O/S) 212, an applications module 214, a beacons signal generation module 216, and a message recognition module 218. Each of the modules and/or software may provide functionality for the device 130, when executed by the processors 200. The modules and/or the software may or may not correspond to physical locations and/or addresses in memory 210. In other words, the contents of each of the modules 212, 214, 216, 218 may not be segregated from each other and may, in fact be stored in at least partially interleaved positions on the memory 210.

The O/S module 212 may have one or more operating systems stored thereon. The processors 200 may be configured to access and execute one or more operating systems stored in the (O/S) module 212 to operate the system functions of the device 130. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 may contain instructions and/or applications thereon that may be executed by the processors 200 to provide one or more services. These instructions and/or applications may, in certain aspects, interact with the (O/S) module 212 and/or other modules of the device 130. The applications module 214 may have instructions, software, and/or code stored thereon that may be launched and/or executed by the processors 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof. In certain embodiments, the applications that are stored in the applications module 214 and executable by the processors 200 may provide services for sharing a message with the companion device 120.

The instructions and/or functionality stored in the beacon signal generation module 216 may be executed by the processors 200 to provide a variety of functionality to the device 130 pertaining to transmitting messages, such as an encryption key via one or more beacons signal broadcasts. The processors 200 may be configured to determine that it is to transmit an encryption key, such as based at least in part on receiving a request for an encryption key or in an intermittent fashion. The processors 200 may further be configured to identify the encryption key to be transmitted. In some example embodiments, the encryption key may be a public key of a public-private pair. In some example embodiments, the encryption key may be of a length such that it may be carried by a single beacon signal, such as a WiFi or a Bluetooth beacon signal, broadcast by the processors via the radio 206 and antennas 204. In other example embodiments, the encryption key may be a length such that it is to be carried by two or more beacon signals generated and broadcast by the processors 200 via the radio 206 and the antennas 204 to be received by the companion device 120. In other words, the encryption key may be segmented to appropriate size segments that can be carried by a sequence of two or more beacon signals. The processors 200 may then be configured to generate the strings that have the corresponding respective segment of the encryption key as the payload and the header may include a protocol indicator, a message index, a total number of messages for the message to be transmitted, and a transmission type (e.g., message or acknowledgement). The strings may then be carried by the beacon signals, as generated and broadcast by the processors 200 via the radio 206 and antennas 204 by executing the instructions stored in the beacon signal generation module 216. In some example embodiments, the processors 200 may be configured to transmit the plurality of beacon signals in sequence of the segment index. The broadcast of the beacon signal may be repeated on a periodical basis, such as, for example, approximately every 100 milliseconds (ms) for a predetermined period of time.

The processors 200 may further be configured to receive acknowledgement messages, carried by a beacon signal and corresponding to each of the segments of the message that are transmitted by the device 130. If the processors 200 do not receive an acknowledgement message corresponding to a particular segment of the encryption key, then the processors 200 may be configured to initiate transmission of the beacon signal of the non-acknowledged segment of the encryption key again until an acknowledgement corresponding to that segment is received.

In certain example embodiments, the base station module 218 may have instructions stored thereon that may enable the processors 200 and the device 130 to provide various functions associated with extracting and reconstituting a message from a series of received beacon signals. The processors 200 may be configured to reconstruct a message, such as the wireless network authentication credentials from a plurality of beacon signals carrying the message and received via the radio 206 and antennas 204.

In example embodiments the processors 200 may be configured to parse a received beacon signal to determine if the received beacon signal indicates a message is carried thereon or if the beacon signal is otherwise an announcement of proximity of the base station 140. In certain cases, the processors 200 may be configured to identify the received beacon signal as carrying a message, or segments thereof, such as a wireless network authentication credential, based at least in part on symbols, bits, or other information carried by the beacon signal. For example, in some cases, a predetermined sequence of characters in a particular field of the beacon signal (e.g., a protocol indicator) may indicate that the beacon signal carries a message.

The processors 200 may be configured to extract message segments from the received beacon signals, and reconstitute the message from the identified message segments, such as by concatenating the received message segments. In example embodiments, the received segments may be segments of the wireless network authentication credentials, such as authentication credentials for connecting to the base station 140. The processors 200 may further be configured to parse portions, such as the SSID field of a WiFi beacon signal, of the received beacon signal to determine and/or extract the message carried thereon.

It will be appreciated that the processors 200 and the device 130 may be configured to listen for the beacon signals on a periodic basis. For example, the message receiving device may be in a state to detect the beacon signal every approximately 0.5 second for a duration of approximately 50 ms. Therefore, the processors 200 may not detect a beacon signal every time a beacon signal is broadcast by the companion device 120. It will be appreciated that there may be a trade-off between the frequency of detecting of the beacon signal and the power usage on the device 130. This may particularly be considered if the device 130 is portable and/or operates using a battery power source. In these example cases, the processors 200 may be configured to modulate the frequency of listening of the beacon signals based at least in part on power usage considerations. For example, there may be a greater frequency and intervals of detection used when the device 130 is in an active mode, instead of a stand-by and/or sleep mode. Furthermore, the device 130 may, in certain example cases, continuously listen for the beacon signals, such as when the device 130 may not be connected to the base station 140.

It will be appreciated that there may be overlap in the functionality of the instructions stored in the one or more operating systems (O/S) module 212, the applications module 214, the beacons signal generation module 216, and the message recognition module 218. In fact, the functions of the aforementioned modules 212, 214, 216, 218 may interact and cooperate seamlessly under the framework of the device 130. Indeed, each of the functions described for any of the modules 212, 214, 216, 218 may be stored in any module 212, 214, 216, 218 in accordance with certain example embodiments of the disclosure. Further, in certain example embodiments, there may be one single module that includes the instructions, programs, and/or applications described within the operating systems (O/S) module 212, the applications module 214, the beacons signal generation module 216, and the message recognition module 218.

Figure 3:
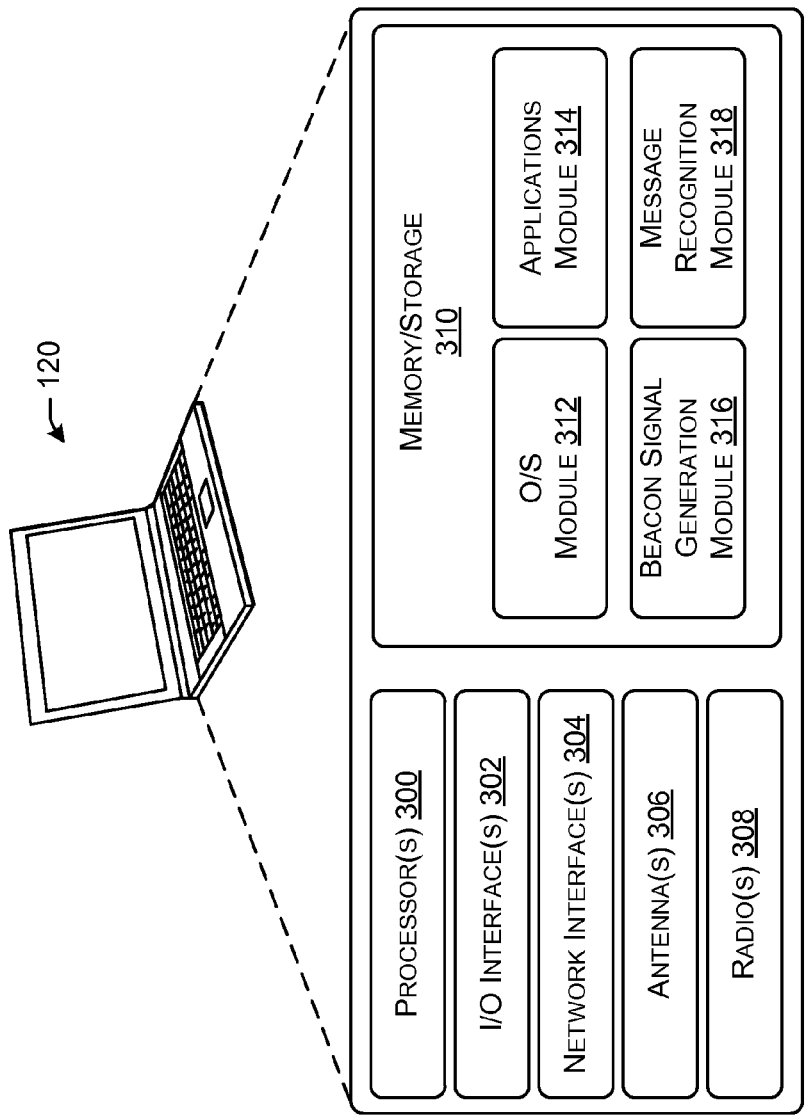
FIG. 3 is a block diagram illustrating a companion device of the environments of any of FIGS. 1A-1C, in accordance with example embodiments of the disclosure.

FIG. 3 is a block diagram illustrating a companion device 120 of the environments 100 of any of FIGS. 1A-1C, in accordance with example embodiments of the disclosure. The companion device 120 may include one or more processors 300, one or more I/O device interfaces 302, one or more network interface(s) 304, one or more antenna(s), one or more radio(s) 306, and one or more memories or storage devices 310. The processors 300, one or more network interface(s) 304, one or more antenna(s) 306, one or more radio(s) 308, and one or more memories or storage devices 310 may be similar to the one or more processor(s) 200, one or more network interface(s) 202, one or more antenna(s) 204, one or more radio(s) 206, and one or more memories or storage devices 210, respectively, as described in reference to FIG. 2, and in the interest of brevity, the description of these elements will not be repeated here. The one or more I/O interface(s) 302 may enable the use of one or more (I/O) device(s) or user interface(s), such as a keyboard and/or mouse. The user 110 may be able to interact with and provide information, such as wireless network authentication credentials, to the companion device 120 via the I/O device interface(s) 302.

The memory 310 may store program instructions that are loadable and executable on the processor(s) 300, as well as data generated or received during the execution of these programs. Turning to the contents of the memory 310 in more detail, the memory 310 may include one or more operating systems (O/S) module 312, an applications module 314, a beacon signal generation module 316, and a message recognition module 318. Each of the modules and/or software may provide functionality for the companion device 120, when executed by the processors 300. The modules and/or the software may or may not correspond to physical locations and/or addresses in memory 310. In other words, the contents of each of the modules 312, 314, 316, 318 may not be segregated from each other and may, in fact be stored in at least partially interleaved positions on the memory 310. The descriptions of the O/S module 312, the applications module 314, the beacon signal generation module 316, and the message recognition module 318 of the companion device 120 may be substantially similar to the descriptions of the O/S module 212, the applications module 214, the beacon signal generation module 216, and the message recognition module 218, respectively, of the device 130 as described with reference to FIG. 2 and, therefore, in the interest of brevity, the description of these elements will not be repeated here.

It will be appreciated that there may be overlap in the functionality of the instructions stored in the O/S module 312, the applications module 314, the beacon signal generation module 316, and the message recognition module 318. In fact, the functions of the aforementioned modules 312, 314, 316, 318 may interact and cooperate seamlessly under the framework of the base station 220. Indeed, each of the functions described for any of the modules 312, 314, 316, 318 may be stored in any module 312, 314, 316, 318 in accordance with certain example embodiments of the disclosure. Further, in certain example embodiments, there may be one single module that includes the instructions, programs, and/or applications described within the O/S module 312, the applications module 314, the beacon signal generation module 316, and the message recognition module 318.

Illustrative Processes

Figure 4:
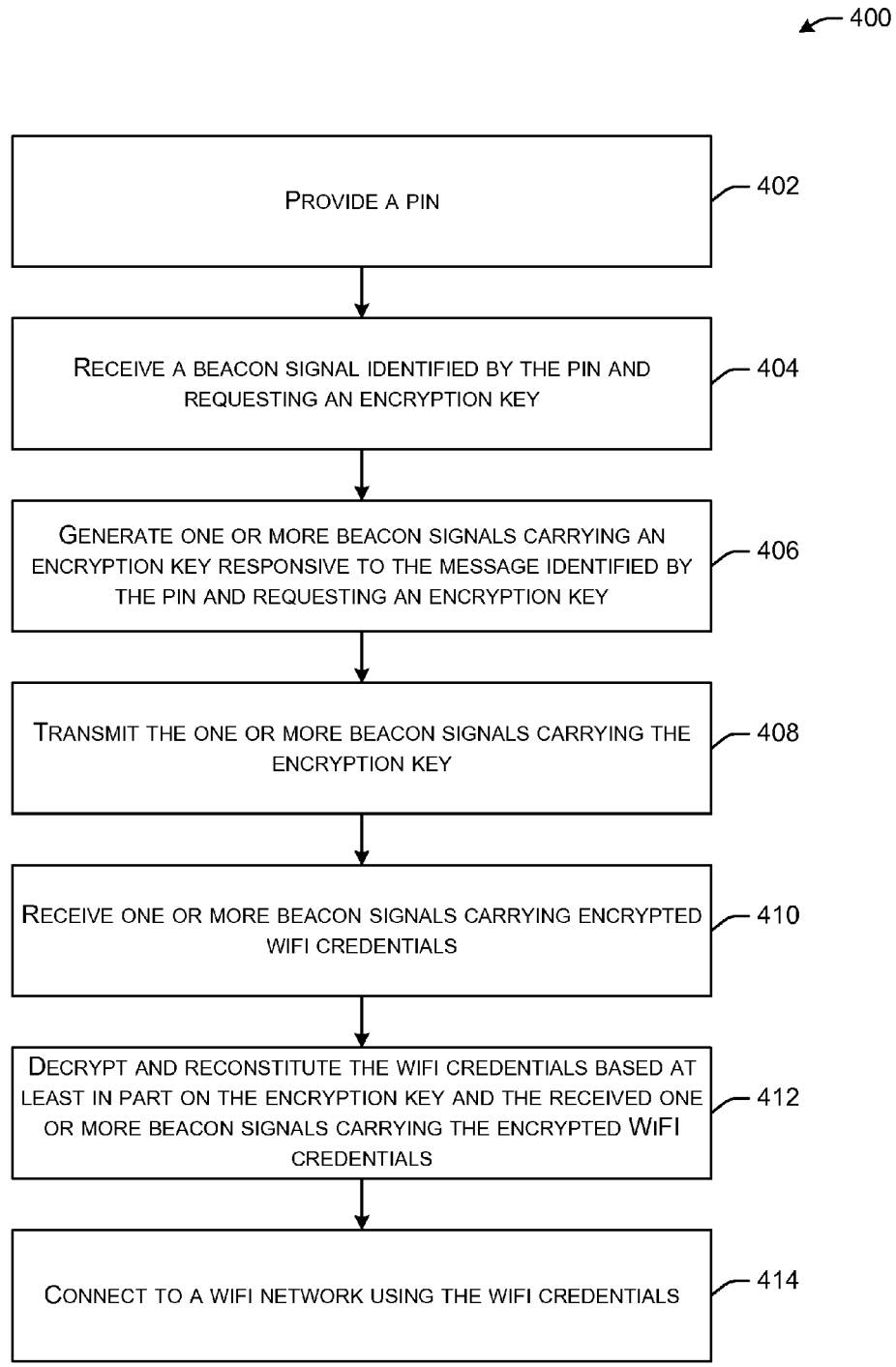
FIG. 4 is an example flow diagram illustrating an example method for connecting to a WiFi network, in accordance with example embodiments of the disclosure.

FIG. 4 is an example flow diagram illustrating an example method 400 for connecting to a WiFi network, in accordance with example embodiments of the disclosure. This method 400 may be performed by the device 130 and the processors 200 thereon in cooperation with one or more entities of environments 100, such as the companion device 120.

At block 402, a personal identification number (PIN) may be provided. In some example embodiments, this PIN may be a fixed PIN such as a code that is provided along with the device, such as at a time of purchase. For example, this code may be scribed or stuck on the device 130 itself. In other example embodiments, this PIN may be generated upon request, such as when a network pairing of the device is to be performed. The PIN may be incorporated into a request for an encryption key that may be carried on a beacon signal and transmitted by the companion device.

At block 404, a beacon signal identified by the PIN and requesting an encryption key may be received. The device 130 may receive this beacon signal carrying the request for encryption key and may identify a match in the PIN carried on the beacon signal with the PIN provided in the beacons signal.

At block 406, one or more beacon signals carrying a public encryption key may be generated responsive to the message identified by the PIN and requesting an encryption key. In example embodiments, the public encryption key may be a length such that it is to be carried by two or more beacon signals generated and broadcast by the device 130 to be received by the companion device 120. In other words, the public encryption key may be segmented to appropriate size segments that can be carried by a sequence of two or more beacon signals. Strings may be generated that have the corresponding respective segment of the public encryption key as the payload and the header may include a protocol indicator, a segment index, a total number of segments for the message to be transmitted, and a transmission type. The strings may then be carried by the beacon signals, as generated by the device 130 and the processors 200 thereon. In other words, a beacon signal may be generated based at least in part on a string corresponding to a segment of the encryption key. The beacon signals may include the segment of the public encryption key. The beacon signals may be constructed by incorporating the public encryption key string into a pre-existing standard beacon signal for an existing protocol, such as WiFi, WiFi direct, or Bluetooth. In certain example embodiments, the beacon signal may be generated by incorporating the message (e.g., segment of the public encryption key) into an SSID data field of the beacon signal.

At block 408, the one or more beacon signals carrying the public encryption key may be transmitted. In some example embodiments, the plurality of beacon signals may be broadcast in sequence of the segment index. The beacon signals may be transmitted for a predetermined period of time, such as, for example, 0.5 seconds, before transmitting the next beacon signal in the sequence of beacon signals carrying the plurality of public encryption key segments. In some example embodiments, an acknowledgement message may be received by the device 130 every time a beacon signal carrying a public encryption key segment may be received by the companion device 120. If an acknowledgement message corresponding to a particular segment of the public encryption key is not received, then the beacon signal of the non-acknowledged segment of the public encryption key may be transmitted again until an acknowledgement corresponding to that segment is received.

At block 410, one or more beacon signals carrying encrypted WiFi credentials may be received. In example embodiments, as each of the beacon signals are received, the received beacon signal may be parsed to determine header information associated with the string carried by the beacon signal. This string may include a payload that may be the corresponding encrypted segment of the WiFi credentials and a header that may include elements such as the total number of strings (e.g., the number of segments of the WiFi credentials), the current message segment index, the message type (e.g., transmission), and the protocol indicator (e.g., sequence of characters indicating that the beacon signal is carrying a message, such as the WiFi credentials). Upon parsing the received beacon signal, the index of the current message segment may be ascertained, such as from the header of the string, to generate an acknowledgement beacon signal that indicates that the message segment of the determined index has been received. This acknowledgement may be broadcast so that it may be received by the companion device 120. The payload, or the encrypted segment of the WiFi credentials may be buffered, such as in memory 210. As each of the beacon signals carrying the WiFi credentials are received, a corresponding acknowledgement beacon signal may be generated and transmitted and the payload may be buffered.

At block 412, the WiFi credentials may be decrypted and reconstituted based at least in part on a private encryption key and the received one or more beacon signals carrying the encrypted WiFi credentials. The private encryption key may correspond to the public encryption key, such as in a public-private key pair, that was transmitted by the processes of blocks 406 and 408. Once all of the beacon signals carrying the WiFi credentials have been received, the corresponding payloads, that may have been stored, such as in memory 210, may be concatenated to generate the encrypted WiFi credentials. The encrypted WiFi credentials may then be decrypted using the private encryption key. Alternatively, each of the segments of the WiFi credentials may first be decrypted using the private encryption key and then the decrypted segments of the WiFi credentials may be concatenated to generate the WiFi credentials. At block 414, a connection to a WiFi network may be established using the WiFi credentials. In other words, the WiFi credentials may be used to connect with the base station 140.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
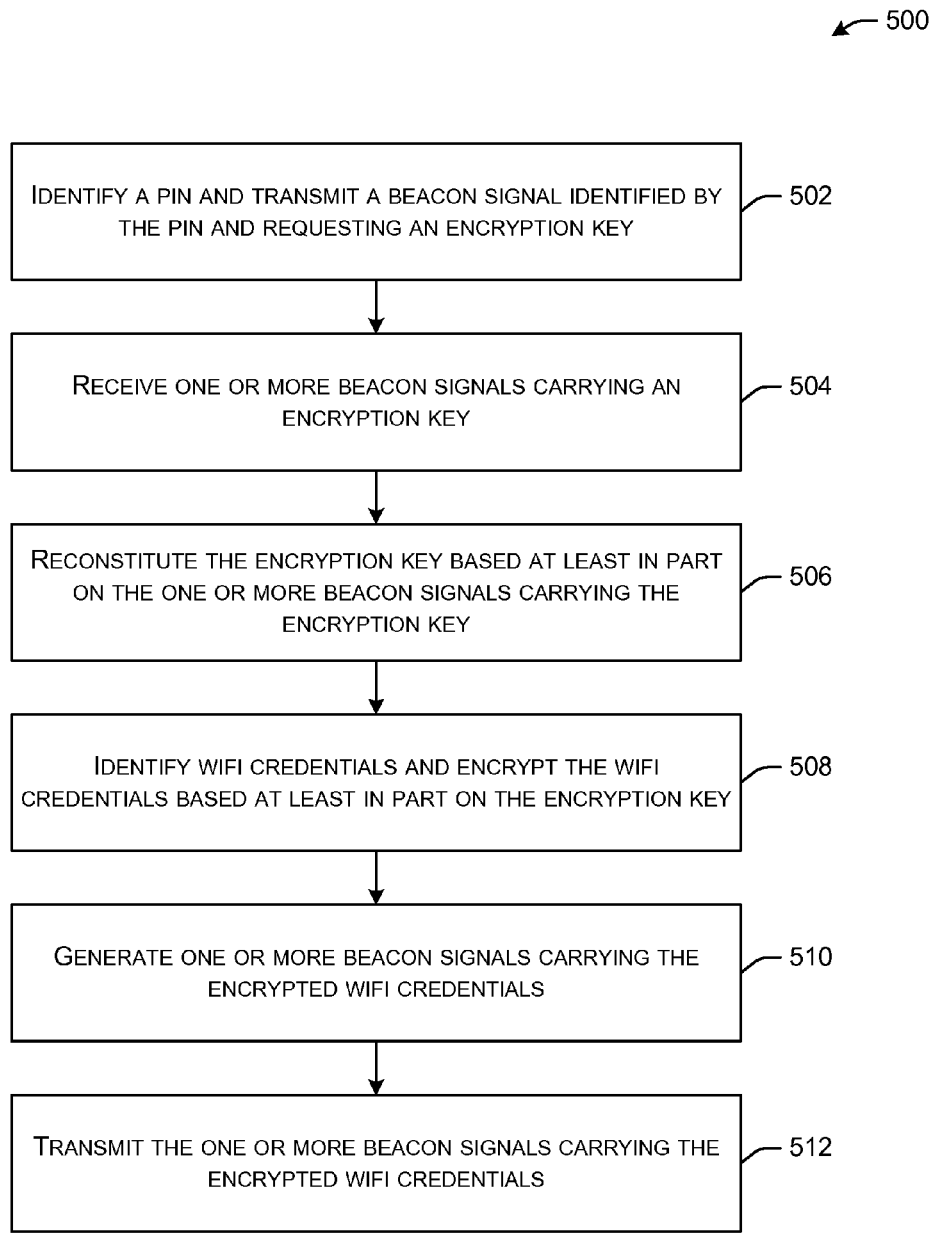
FIG. 5 is an example flow diagram illustrating an example method for transmitting WiFi credentials, in accordance with example embodiments of the disclosure.

FIG. 5 is an example flow diagram illustrating an example method 500 for transmitting WiFi credentials, in accordance with example embodiments of the disclosure. This method 500 may be performed by the companion device 120 and the processors 300 thereon in cooperation with one or more entities of environments 100, such as the device 130.

At block 502, a PIN may be identified and a beacon signal identified by the PIN and requesting an encryption key may be transmitted. The PIN may be received, in example embodiments, via input from the user 110 via one or more input interfaces, such as a keyboard, speaker, and/or touch sensitive display. The request to broadcast the encryption key and carrying the PIN corresponding to the recipient device 130 may then be generated. In example embodiments, the request for the encryption key may be a message carried along with the PIN in the SSID data field, such as of a WiFi beacon signal. In example embodiments, the request for the encryption key may by carried by more than on beacon signal, as broadcast by the companion device 120.

At block 504, one or more beacon signals carrying a public encryption key may be received. In example embodiments, the encryption key may be a length such that it is carried by two or more beacon signals. In other words, the public encryption key may be segmented to appropriate size segments that may be carried by a sequence of two or more beacon signals. The received beacon signals may be parsed to identify the string that may be carried thereon and corresponding respective segments of the public encryption key. In example embodiments, the strings may further include a corresponding header that may include a protocol indicator, a message segment index, a total number of message segments for the message to be transmitted, and a transmission type. In some example embodiments, the corresponding header may only include an index to indicate the order in which to reconstitute the segments of the public encryption key. It will be appreciated that in some example embodiments, the segments of the public encryption key, as carried by the received beacon signals, may not be received in sequential order, and may, in fact, be received in any suitable order.

In some example embodiments, an acknowledgement message may be transmitted every time a beacon signal carrying a public encryption key segment may be received. This acknowledgement message may be incorporated in and carried on a beacon signal in a similar fashion as described for the transmission of the public encryption key. In some example embodiments, the payloads or the segments of the public encryption keys carried by each of the beacon signals may be identified and stored, such as on the memory 310.

At block 506, the public encryption key may be reconstituted based at least in part on the one or more beacon signals carrying the public encryption key. Once all of the beacon signals carrying the public encryption key have been received, the corresponding payloads, that may have been stored, such as in memory 310, may be concatenated to generate the public encryption key. In other words, the segments of the public encryption keys, as received via a plurality of detected beacon signals, may be stitched back together.

At block 508, WiFi credentials may be identified and encrypted based at least in part on the public encryption key. The WiFi credentials to be provided to the device 130 may be identified, such as by the WiFi network to which the companion device 120 is connected or by user 110 input to the companion device 120. Once the WiFi credentials are identified, the WiFi credentials may be encrypted utilizing the public encryption key, as received by the processes of blocks 504 and 506.

At block 510, one or more beacon signals carrying the encrypted WiFi credentials may be generated. In example embodiments, the WiFi credentials may be a length such that it is to be carried by two or more beacon signals. In other words, the WiFi credentials may be segmented to appropriate size segments that can be carried by a sequence of two or more beacon signals. Strings may be generated that have the corresponding respective segment of the WiFi credentials as the payload and the header may include a protocol indicator, a message segment index, a total number of segments for the message to be transmitted, and a transmission type. A beacon signal may be generated based at least in part on a string corresponding to a segment of the WiFi credentials. The beacon signal may include the segment of the WiFi credentials. The beacon signals may be constructed by incorporating the WiFi credentials string into a pre-existing standard beacon signal for an existing protocol, such as WiFi or Bluetooth. In certain example embodiments, the beacon signal may be generated by incorporating the message into an SSID data field of the beacon signal.

At block 512, the one or more beacons signals carrying the encrypted WiFi credentials may be transmitted. The beacon signals may be transmitted for a predetermined period of time, such as, for example, 0.5 seconds, before transmitting the next beacon signal in the sequence of beacon signals carrying the plurality of encryption key segments. In some example embodiments, an acknowledgement message may be received responsive to transmission of every beacon signal carrying an encrypted WiFi segment may be received by the device 130. If an acknowledgement message corresponding to a particular segment of the encrypted WiFi credential is not received, then the beacon signal of the non-acknowledged segment of the WiFi credential may be transmitted again until an acknowledgement corresponding to that segment is received.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
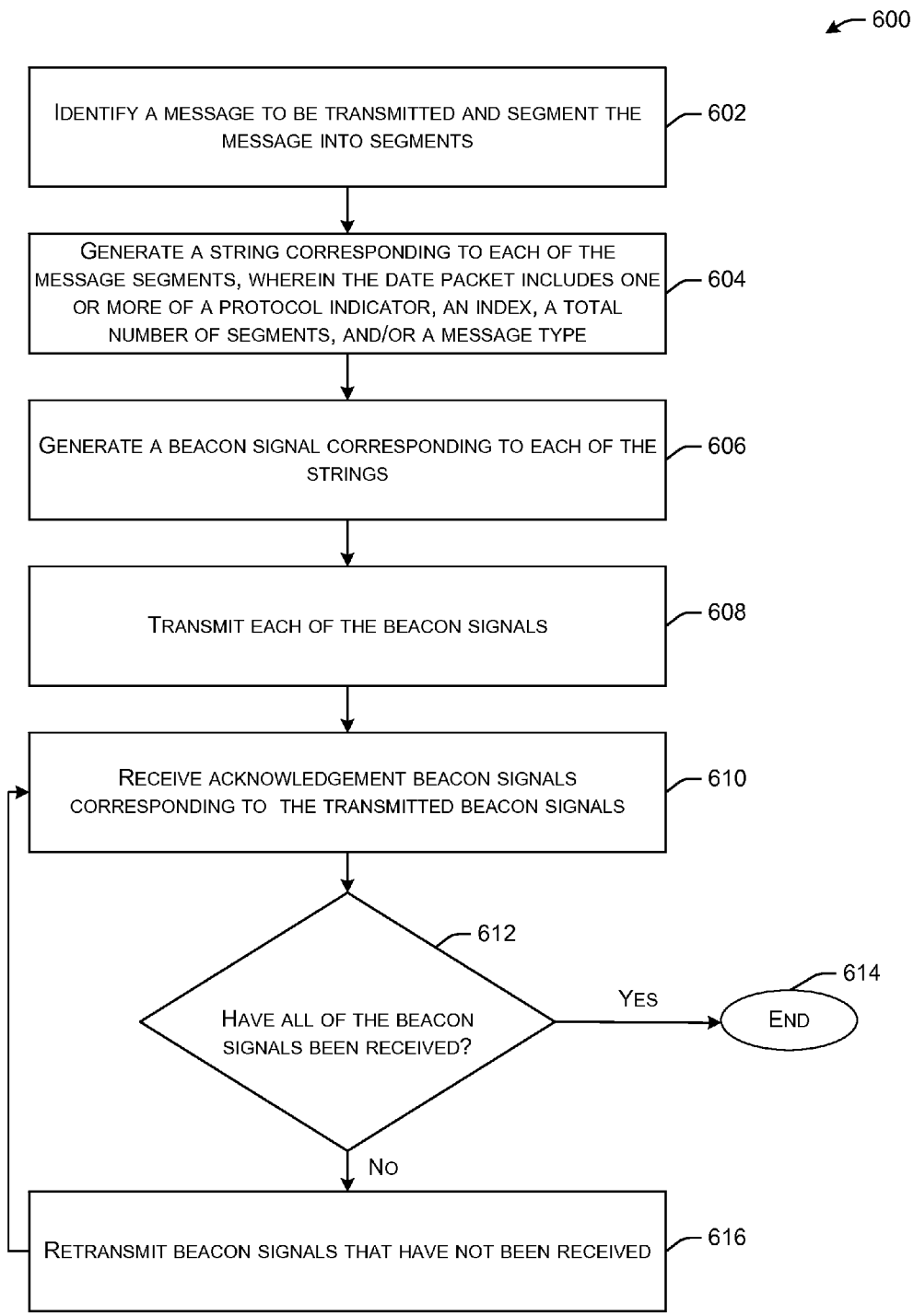
FIG. 6 is an example flow diagram illustrating an example method for transmitting a message over a plurality of wireless beacon signals, in accordance with example embodiments of the disclosure.

FIG. 6 is an example flow diagram illustrating an example method 600 for transmitting a message over a plurality of wireless beacon signals, in accordance with example embodiments of the disclosure. The method 600 may be performed by either the device 130 and the processors 200 thereon or the companion device 120 and the processors 300 thereon. For example, the method 600 may be performed by the device 130 to transmit an encryption key (e.g., a public encryption key) as a message carried by a plurality of beacon signals to the companion device 120. As another example, the method 600 may be performed by the companion device 120 to transmit wireless network authentication credentials (e.g., WiFi authentication credentials) as a message carried by a plurality of beacon signals to the device 130.

At block 602, a message may be identified to be transmitted and the message may be segmented into segments. As discussed above, the message may be the public encryption key from the device 130, the wireless network credentials from the companion device 120, or indeed any other message from any other source. In example embodiments, the message may be encoded in base64 encoding or ASCII encoding. The message, once identified, may be determined to be too long to be carried by a single beacon signal. For example, in the case of using WiFi beacons signals, the message may be longer than approximately 32 bits. In this case, the message may be segmented into multiple segments that may be carried by the beacon signals designated to carry the message segments and the associated overhead (e.g., string header). For example, if the string allowed length is a maximum of 32 bytes in the SSID data field of a WiFi packet and the expected length of the header is 7 bytes, then a payload (e.g., message segment) of 25 bytes or less may be carried on each beacon signal.

At block 604, a string corresponding to each of the message segments may be generated, wherein the string includes one or more of a protocol indicator, an index, a total number of segments, and/or a message type. The string may include the payload plus the one or more header information, such as the protocol indicator, the message type, the packet index, and the total number of segments associated with the message. Therefore, in example embodiments, a particular string may have the format of: <protocol indicator> <message type> <packet index> <total number of segments> <message segment>. In other example embodiments, the header of the string may only include the index, but no the message type, packet index, or the total number of segments. The protocol indicator may be any string of characters (e.g., "BAIR") that may indicate that the beacon signal is being utilized to carry segmented messages. The message type may be, for example equal to '1' for sending text and '0' for acknowledging the receipt of text. Consider an example of transmitting a message of "Hello, this is text that is pretty long." In this case, it may be determined that two strings may be needed to transmit this message in its entirety. Therefore, the total number of segments may be 2. The first string, with and index of 0, may be "BAIR102 Hello, this is text that" and the second string, with an index of 1, may be "BAIR112 is pretty long."

In some alternative example embodiments, a protocol indicator may not be used and therefore, other suitable mechanism may be utilized by the recipient device 120, 130 to identify that this message transfer protocol is being utilized. An example mechanism may include actuating a switch (e.g., a button) to indicate when beacon signals utilizing this protocol is used. Another example mechanism may include identifying the protocol from other overhead associated with the beacon signal. For example, media access control (MAC) header information carried by the beacon signal, such as in the header of a WiFi beacon signal, may be used to identify a transmission utilizing the message transfer protocols as described herein. In this case, the message receiving device 120, 130 may identify an expected MAC identifier associated with a device 120, 130 transmitting the beacon signal that may be transferring messages utilizing the protocol described herein.

At block 606, a beacon signal corresponding to each of the strings may be generated. The beacon signal may be generated by incorporating each of the strings corresponding to each of the message segments into a beacon signal. In example embodiments, pre-established beacon signals may be utilized, such as WiFi beacon signals. For example, the strings may be incorporated into the SSID data field of a corresponding respective WiFi beacon. At block 608, each of the beacon signals may be transmitted.

At block 610, an acknowledgement beacon signal corresponding to the transmitted beacon signals may be received. The acknowledgement beacon may also be carried by similar types of beacon signals as those used in the processes of block 606. For example, an acknowledgement string corresponding to the first string from the example discussed with reference to block 604 may be "BAIR002."

At block 612, it may be determined if all of the acknowledgment beacon signals been received. This may be utilized to determine whether the corresponding beacon signal to each of the received acknowledgment beacon signals has been received at the transmitting entity. If at block 612 it is determined that all of the acknowledgment beacon signals have been received by the receiving entity, then the method 600 may end at block 614. If however, it is determined that not all of the beacon signals have been received by the receiving entity, then at block 616, the beacon signals that have not been received may be retransmitted.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
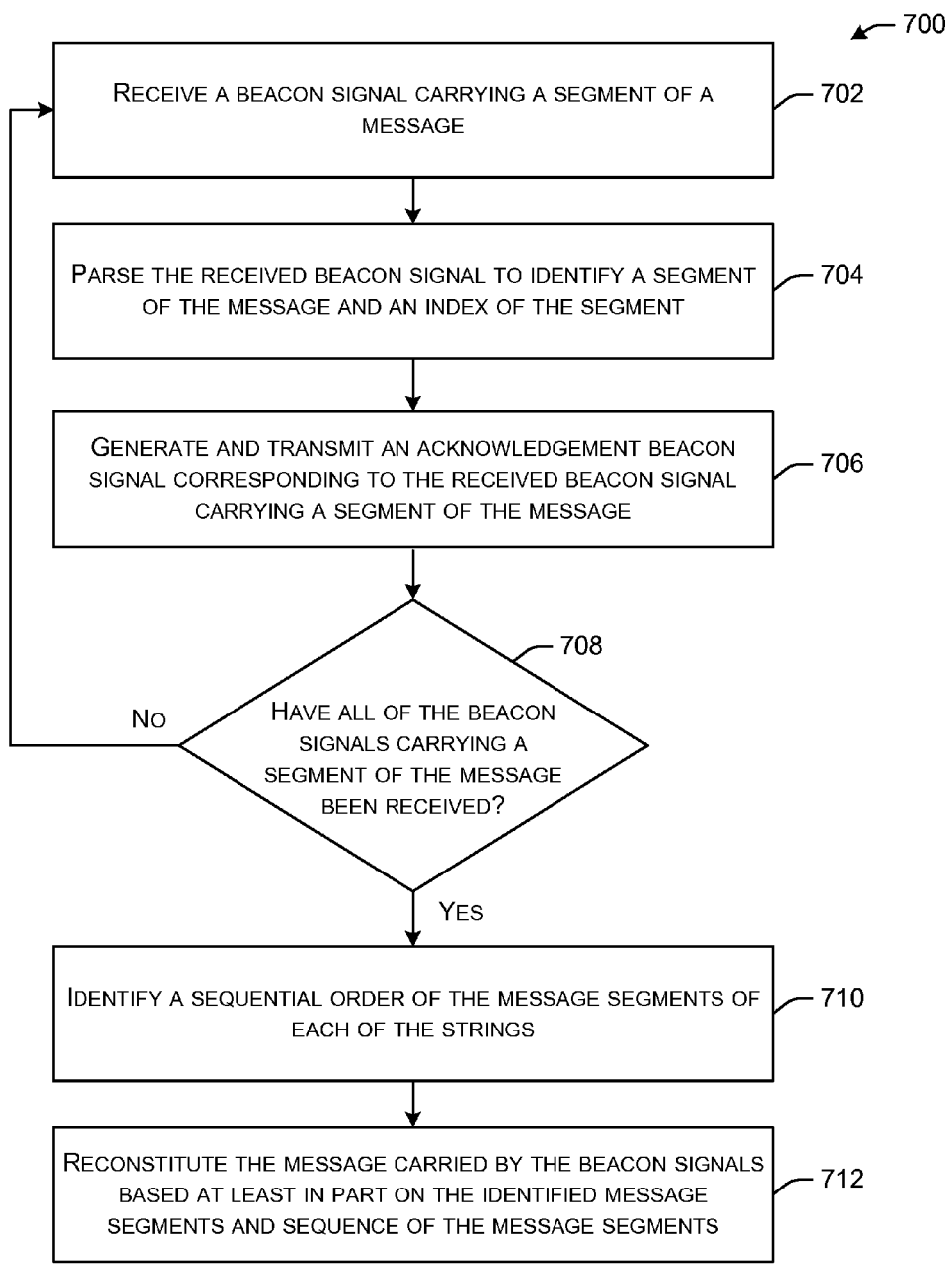
FIG. 7 is an example flow diagram illustrating an example method for reconstituting a message received via a plurality of wireless beacon signals, in accordance with example embodiments of the disclosure.

FIG. 7 is an example flow diagram illustrating an example method 700 for reconstituting a message received via a plurality of wireless beacon signals, in accordance with example embodiments of the disclosure. The method 700 may be performed by either the device 130 and the processors 200 thereon or the companion device 120 and the processors 300 thereon. For example, the method 700 may be performed by the device 130 to receive and reconstitute wireless network authentication credentials carried by a plurality of beacon signals transmitted by the companion device 120. As another example, the method 700 may be performed by the companion device 120 to receive a public encryption key carried by a plurality of beacon signals transmitted by the device 130.

At block 702, a beacon signal carrying a segment of a message may be received. It may be determined that a received beacon signal carries a message in accordance with the protocol described here, based on identifying a protocol indicator, an expected MAC identifier associated with the received beacon signal, and/or an actuation of one or more switches on the receiving device 120, 130. At block 704, the received beacon signal carrying a segment of the message may be parsed to identify a corresponding index associated with the message segment. This index information may be found in the same data field as that which carries the payload. For example, in a WiFi beacon signal, this index information may be found in the SSID data field of the beacon signal.

At block 706, an acknowledgement beacon signal corresponding to the received beacon signal carrying a segment of the message may be generated and transmitted. The beacon signals may be constructed by incorporating the identified index of the received string into a pre-existing standard beacon signal for an existing protocol, such as WiFi, WiFi direct, or Bluetooth. In certain example embodiments, the beacon signal may be generated by incorporating the acknowledgement message into an SSID data field of the beacon signal.

At block 708, it may be determined if all of the beacon signals carrying a segment of the message have been received. This determination may be made by checking whether all of the expected indexes of the strings have been received. All of the expected indexes may be ascertained from the total number of strings or message segments that may be identified and carried in the received beacon signals. If all of the message segments have not been received, then the method 700 may return to block 702 to receive additional beacon signals that have not yet been received. In some cases, these beacon signals may be received out of index sequence. If at block 708 it is determined that all of the beacon signals carrying the segments of the message have been received, then at block 710, a sequential order of the message segments may be identified. This may be determined form the indexes of each of the segments, as determined by the processes of block 704. At block 712, the message carried by the beacon signals may be reconstituted based at least in part on the identified payload and sequence of the strings. In example embodiments, the message segments may be concatenated in index order.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
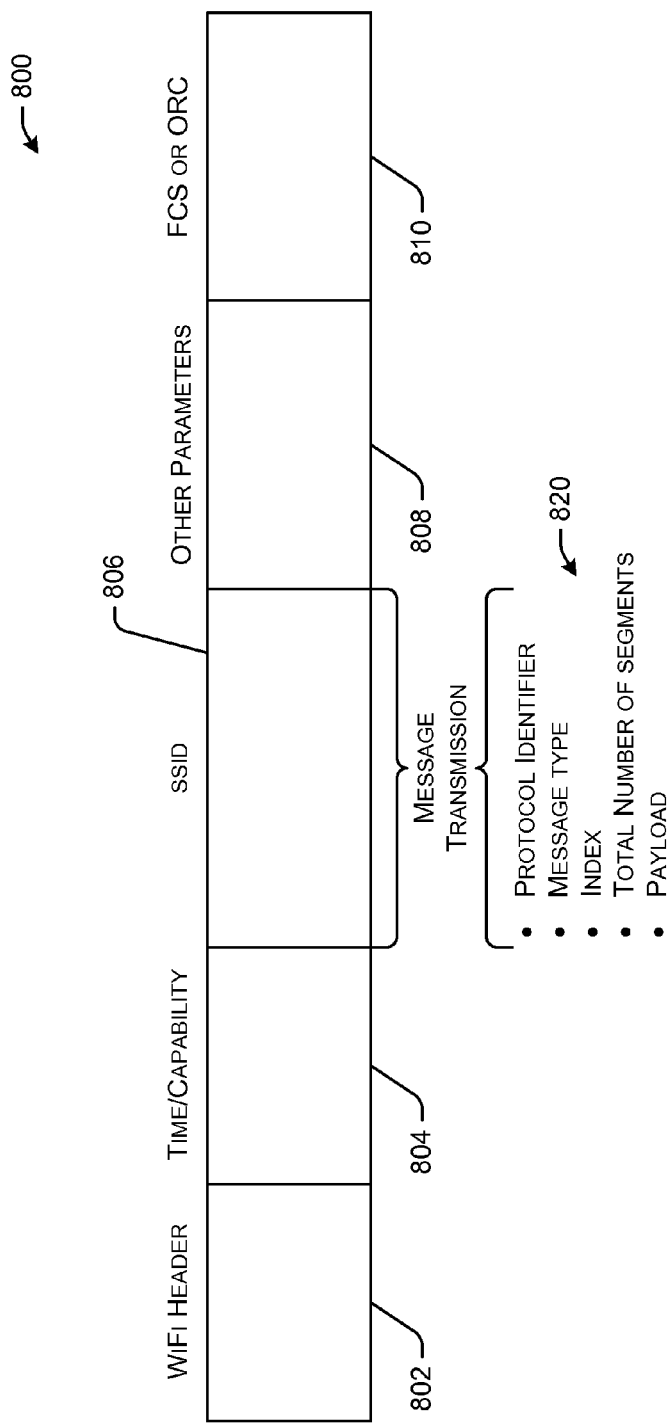
FIG. 8 is a diagram illustrating example fields of an example beacon signal used for messaging, in accordance with example embodiments of the disclosure.

FIG. 8 is a diagram illustrating example fields 802, 804, 806, 808, 810 of an example beacon signal 800 used for messaging, in accordance with example embodiments of the disclosure. This beacon signal 800 may be similar to beacon signals used in WiFi, but may be used with any suitable protocol and/or format of message broadcasting. Each of the fields may include one or more bits of data. In example embodiments, the header field 802 may include a media access control (MAC) header. In some example embodiments, the MAC header information may be used to identify a device that is utilizing the message transfer protocols as described herein. The time/capability field 804 may include timestamps or time synchronization data, beacon interval data, and information about capability and/or types of services offered. The SSID field 806 may generally carry an identification of the BSS and/or ESS. In one sense, this may be the "name" of the wireless network. The other parameters field 808 may include information about channels, frequencies, contention, or the like. The FCS/CRC field may provide transmission integrity check information of the beacon signal 800, such as a cyclic redundancy check (CRC) and/or a frame check sequence (FCS). In certain example embodiments of the disclosure, the beacon signal 800 may be modified to carry the message, such as by the companion device 120 and/or the device 130. In some example cases, the message may be carried in the SSID field 806. The SSID field 806 may have a size limit, such as, for example, 32 bytes. Therefore, in example embodiments, the message size carried by the beacon signal may be constrained by the size of the SSID field 806. For example, in some cases, the maximum message size may be 32 bytes. This, in an example embodiment using base64 encoding or ASCII encoding, may correspond to a maximum message size of about 32 characters. It will also be appreciated that in certain further example embodiments, non-text based messages may be carried by the beacon signal. In example embodiments, the message may be incorporated in a string 820 carried in the SSID field 806. The string 820, in example embodiments, may include a message segment, as well as an index associated with the message segment that identifies the order of the carried message segment relative to the other message segments of the message. In other example embodiments, the string may include one or more of a protocol indicator, an index, a total number of segments, and/or a message type, along with the message segment. It will be appreciated that relatively fewer header items included in the header of the string 820 might result in relatively more bits available for carrying message segments. Therefore, in example embodiments, relatively lower overhead of the header information in the overall string 820 may result in relatively fewer total number of message segments, and therefore relatively fewer beacon signal transmissions, needed for transmitting a message.

Figure 9:
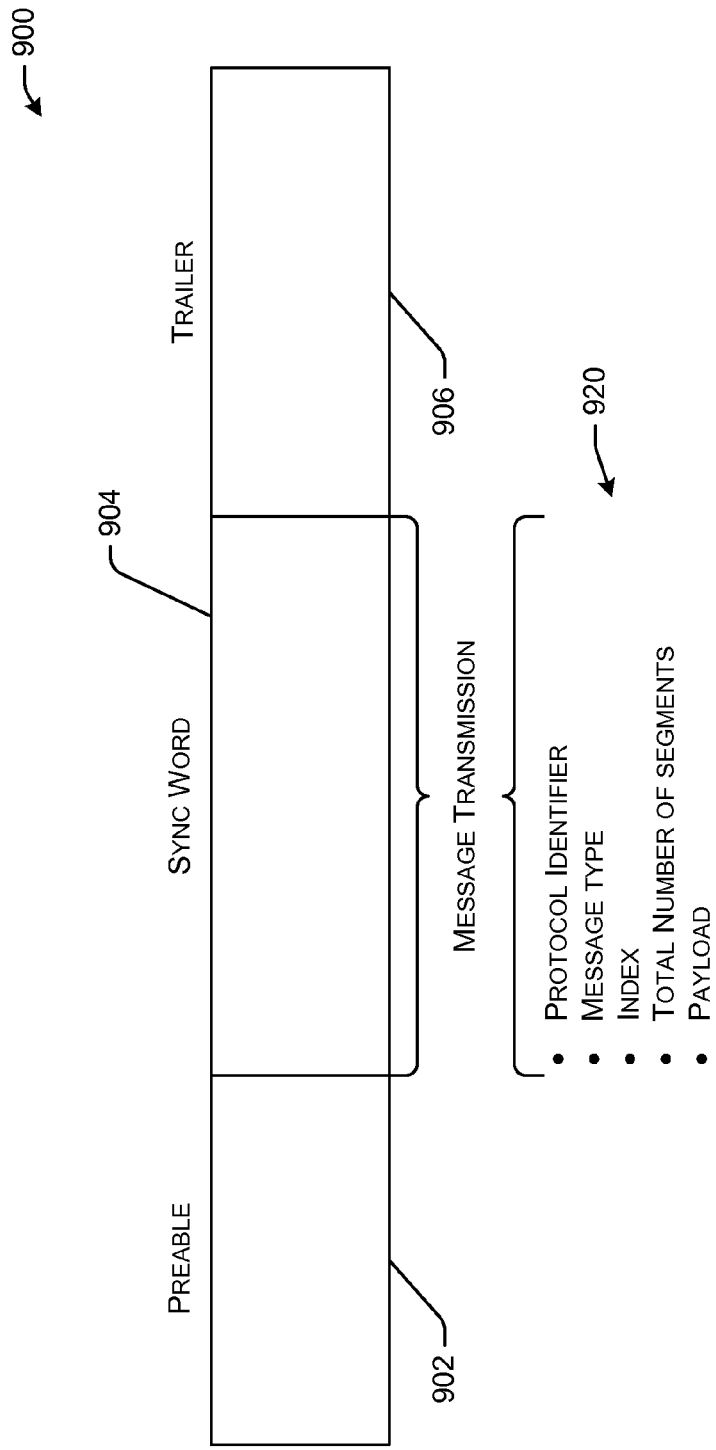
FIG. 9 is a diagram illustrating example fields of another example beacon signal used for messaging, in accordance with example embodiments of the disclosure.

FIG. 9 is a diagram illustrating example fields 902, 904, 906 of a beacon signal 900 used for messaging, in accordance with example embodiments of the disclosure. This beacon signal 900 may be similar to a Bluetooth beacon signal, with a preamble field 902, a sync word field 904, and/or a trailer field 906. In this beacon signal 900, the message may be incorporated in and carried by any of the fields, such as the sync word field 904. In certain example embodiments, the beacon signal 900 may be limited to 68 bits of length and, therefore, a message carried by the beacon signal 900 may be limited in length by the total bit length of the beacon signal 900. In example embodiments, the message may be incorporated in a string 920 carried in the sync word field 904. The string 920, in example embodiments, may include a message segment, as well as an index associated with the message segment that identifies the order of the carried message segment relative to the other message segments of the message. In other example embodiments, the string may include one or more of a protocol indicator, an index, a total number of segments, and/or a message type, along with the message segment.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. An electronic device, comprising:
   at least one memory that stores computer-executable instructions;
   at least one processor that accesses the at least one memory, wherein the at least one processor executes the computer-executable instructions to:
      receive a beacon signal comprising a request for an encryption key, the request having a code that identifies a second device;
      identify a message to transmit to the second device, the message comprising the encryption key;
      obtain a first segment of the message and a first index corresponding to the first segment;
      generate a first string using the first segment and the first index;
      transmit a first plurality of beacon signals during a first period of time, the first plurality of beacon signals including a first beacon signal, wherein a service set identifier (SSID) field of the first beacon signal comprises the first string and a protocol indicator indicative of the first beacon signal carrying a segmented message;
      obtain a second segment of the message and a second index corresponding to the second segment;
      generate a second string using the second segment, and the second index;
      transmit a second plurality of beacon signals during a second period of time after the first period of time, the second plurality of beacon signals including a second beacon signal, wherein a second service set identifier field of the second beacon signal comprises the second string;
      receive, from the second device, a third beacon signal indicative of receipt of the first segment of the message; and
      receive, from the second device, a fourth beacon signal indicative of receipt of the second segment of the message.

2. The electronic device of claim 1, wherein the at least one processor further executes the computer-executable instructions to generate the first string further using at least one of a message type or a total number of segments.

3. The electronic device of claim 1, wherein the at least one processor further executes the computer-executable instructions to:
   obtain a third segment of the message and a third index corresponding to the third segment;
   generate a third string using a third segment and the third index;
   transmit a third plurality of beacon signals during a third period of time after the second period of time, the third plurality of beacon signals including a fifth beacon signal, wherein a third service set identifier of the fifth beacon signal comprises the third string;
   determine that a sixth beacon signal has not been received after a fourth period of time, wherein the sixth beacon signal indicates receipt of the third segment of the message; and
   retransmit at least one of the third plurality of beacon signals.

4. The electronic device of claim 1, wherein the message further comprises, a third service set identifier of an access point device, or an authentication credential.

5. The electronic device of claim 1, wherein the at least one processor further executes the computer-executable instructions to transmit the second beacon signal after receiving the third beacon signal.

6. A computer-implemented method, comprising:
   transmitting, by an electronic device comprising one or more processors, a beacon signal comprising a request for an encryption key, the request having a code that identifies the electronic device;
   receiving, by the electronic device, a first plurality of beacon signals during a first period of time, the first plurality of beacon signals including a first beacon signal carrying a first string in a service set identifier (SSID) field, the SSID field comprising information indicative of the first beacon signal carrying a segmented message;

receiving, by the electronic device, a second plurality of beacon signals during a second period of time, a second beacon signal of the second plurality of beacon signals carrying a second string;

identifying, by the electronic device, a first segment of a message and a first index corresponding to the first segment of the message by processing the first string, the message comprising the encryption key;

identifying, by the electronic device, a second segment of the message and a second index corresponding to the second segment of the message by processing the second string; and determining, by the electronic device, the message based at least in part on the first segment of the message, the first index, the second segment of the message, and the second index.

7. The computer-implemented method of claim 6, wherein the message comprises an authentication credential associated with a wireless network, and wherein the method further comprises connecting, by the electronic device, to the wireless network using the authentication credentials.

8. The computer-implemented method of claim 6, wherein the first string further comprises at least one of a protocol identifier, a message type or a total number of segments.

9. The computer-implemented method of claim 6, wherein the first segment of the message is in at least one of: (i) base64 format; (ii) extensible markup language (XML) format; or (iii) American Standard Code for Information Interchange (ASCII) format.

10. The computer-implemented method of claim 6, wherein the first string begins with the information, and wherein the information comprises a sequence of characters identifying a communications protocol to communicate segmented messages.

11. The computer-implemented method of claim 6, wherein the identifying the first segment of the message comprises decrypting, by the electronic device, the first string.

12. The computer-implemented method of claim 6, further comprising:

transmitting, by the electronic device, a third beacon signal acknowledging receipt of the first segment of the message;

transmitting, by the electronic device, a fourth beacon signal acknowledging receipt of the second segment of the message.

13. At least one non-transitory computer-readable storage medium comprising computer-executable instructions that, when executed by one or more processors, executes operations comprising:

receiving a beacon signal comprising a request for an encryption key, the request having a code that identifies an electronic device;

identifying a message to be transmitted to the electronic device, the message comprising the encryption key;

generating a first string using a first segment of the message and a first index corresponding to the first segment of the message;

transmitting a first plurality of beacon signals during a first period of time, the first plurality of beacon signals including a first beacon signal, wherein a service set identifier (SSID) field of the first beacon signal comprises the first string and information indicative of the first beacon signal carrying a segmented message;

generating a second string using a second segment of the message and a second index corresponding to the second segment of the message; and transmitting a second plurality of beacon signals during a second period of time after the first period of time, a second beacon signal of the second plurality of beacon signals including the second string.

14. The at least one non-transitory computer-readable storage medium of claim 13, wherein the generating the first string further comprises incorporating at least one of a message type or a total number of segments.

15. The at least one non-transitory computer-readable storage medium of claim 13, wherein the operations further comprise:

receiving a third beacon signal, wherein the third beacon signal indicates receipt of the first segment of the message; and receiving a fourth beacon signal, wherein the fourth beacon signal indicates receipt of the second segment of the message.

16. The at least one non-transitory computer-readable medium of claim 13, wherein the operations further comprise:

determining that a first acknowledgement beacon signal corresponding to the transmission of the first beacon signal has not been received after a period of time; and retransmitting the first beacon signal.

17. The at least one non-transitory computer-readable medium of claim 13, wherein the generating the first string further comprises using the encryption key.

18. The at least one non-transitory computer-readable storage medium of claim 13, wherein the message is in at least one of: (i) base64 format; (ii) extensible markup language (XML) format; or (iii) American Standard Code for Information Interchange (ASCII) format.

19. The at least one non-transitory computer-readable storage medium of claim 13, wherein the transmitting the first plurality of beacon signals further comprises including the information at the beginning of the first string.

* * * * *